US008151666B1

(12) United States Patent
Kraus (10) Patent No.: US 8,151,666 B1
(45) Date of Patent: Apr. 10, 2012

(54) TWIST THROTTLE WITH INTEGRAL HYDRAULIC MASTER CYLINDER

(76) Inventor: Satya Kraus, Cazadero, CA (US)

( * ) Notice: Subject to any disclaimer, the term of this patent is extended or adjusted under 35 U.S.C. 154(b) by 696 days.

(21) Appl. No.: 12/325,238

(22) Filed: Nov. 30, 2008

Related U.S. Application Data (60) Provisional application No. 60/991,644, filed on Nov. 30, 2007.

(51) Int. Cl.
*G05G 11/00* (2006.01)
(52) U.S. Cl. .......................................................... 74/488
(58) Field of Classification Search ................ 74/484 R, 74/485, 486, 487, 488, 489, 56.57, 501.6, 74/216, 517, 518, 502.2; 60/594, 550, 579; 180/219, 335
See application file for complete search history.

(56) References Cited

U.S. PATENT DOCUMENTS

| | | | | | |
|---|---|---|---|---|---|
| 2,271,273 A | * | 1/1942 | Mueller | ........................ | 188/344 |
| 2,788,676 A | * | 4/1957 | Spexarth | ........................ | 74/489 |
| 4,241,687 A | * | 12/1980 | DuBois et al. | .................. | 440/63 |
| 4,635,442 A | * | 1/1987 | Bass | ............................... | 60/594 |
| 5,050,381 A | * | 9/1991 | Matsuno et al. | ................ | 60/584 |
| 5,443,134 A | * | 8/1995 | Gajek et al. | .................... | 188/344 |
| 6,978,694 B2 | * | 12/2005 | Peppard | ........................... | 74/489 |
| 7,204,169 B2 | * | 4/2007 | Mitchell | ......................... | 74/489 |
| 7,770,490 B1 | * | 8/2010 | Weiss | ........................... | 74/502.2 |
| 7,775,136 B2 | * | 8/2010 | Schwulst | ....................... | 74/488 |

* cited by examiner

*Primary Examiner* — Thomas R Hannon
*Assistant Examiner* — Alan Waits
(74) *Attorney, Agent, or Firm* — Gary Hoenig (57) ABSTRACT

The present invention is a handle grip comprising a twist throttle with an integrated hydraulic master cylinder directed to vehicle throttle and brake or clutch controls and suitable for mounting and use on motorcycle handle bar wherein the operator selectively twists the handle grip in one direction to retract a throttle cable and in the opposite direction to release the throttle cable and activate a hydraulic master cylinder capable of providing hydraulic fluid to a hydraulically activated mechanism on the vehicle. A helical cam surface within the twist grip mechanism guides centrally positioned throttle and hydraulic cam followers within an inner stem cylinder bore forcing the followers longitudinally within the bore to activate the hydraulics or throttle. The pitch of the helical cam surface defines the distance of grip rotation and the twisting torque required to move the followers predetermined distances within the stem bore to provide sufficient activation force.

11 Claims, 5 Drawing Sheets

TWIST THROTTLE WITH INTEGRAL HYDRAULIC MASTER CYLINDER

FIELD OF INVENTION

The present invention relates to vehicle throttle and hydraulic activators. More particularly, this invention is directed to an operator twist activated vehicle throttle control with an integral hydraulic master cylinder. The invention is principally directed to motorcycle handlebar mounted throttle and hydraulic activator applications.

BACKGROUND OF THE INVENTION

Vehicles having steering control by means of a handlebar, such as a motorcycle or scooter, typically have lever mechanisms pivotally mounted to the handlebar adjacent to the handlebar grips with a lever extending over and adjacent to the grip. These levers are typically used to pull cables or to activate hydraulic mechanisms that, in turn, activate the vehicle brake, throttle, or clutch. To utilize the lever mechanisms, the operator must loosen the grasp of the handlebar grip so as to extend the fingers outwardly and over the lever mechanism to grasp the lever portion with the thumb extended around the grip such that a squeezing motion may be used to activate the vehicle brake or clutch mechanism. The motion necessitates the operator to relinquish some control of the steering mechanism to accomplish the braking or clutch motion.

The majority of prior art handle controls, including thumb throttles, require activation by relinquishing some steering control to grip and squeeze an adjacent lever mechanism.

Various forms of twist grip mechanisms integrated into a handlebar operator grip have been proposed for activation of cable linked throttles wherein a twisting action of the handlebar grip draws a cable onto a rotatable pulley mechanism thereby pulling the cable to activate the throttle located at the remote end of the cable. These forms of twist throttle controls fix and route the control cable to the outside surface of the handlebar. These twist throttle mechanisms have a singular purpose of activating cable linked throttles; however, additional control functions such as clutch and brake control, in particular hydraulic systems, remain relegated to lever activation mechanisms.

Braking and clutch mechanisms, particularly on motorcycles, are often hydraulic thereby necessitating a hydraulic master cylinder to be mounted in close proximity to the operator's hand to accomplish the required activation leverage and hence are positioned on the outside of the handlebar near the operator grip. Hydraulic master cylinders incorporating a lever mechanism activation typically include the hydraulic lines that are lashed to outside surface of the handle bar resulting in exposure of the hydraulic system to damage and road debris as well as being unsightly from a design point of view.

What is needed is an improved handlebar mounted vehicle control grip device incorporating hydraulic brake or clutch control with a cable linked throttle control selectively activated by a twisting action of the grip, and having control cables and hydraulic lines positioned within the handlebar for protection and improved aesthetic appearance.

SUMMARY OF THE INVENTION

Accordingly, the present invention is directed to a vehicle control mechanism, and, more specifically, to a twist throttle with an integrated hydraulic master cylinder also activated by a twist motion mountable to the end of a tubular bar such as a handlebar, thereby substantially obviating one or more of the problems due to the limitations and disadvantages of the related art.

The present invention is a combination cable type throttle and hydraulic master cylinder mountable to the open end of a tubular handlebar such as a motorcycle handlebar forming an operator grip wherein the grip is rotatable around the axis of the handlebar to activate a variable throttle mechanism when twisted in one direction past a neutral position and to selectively activate a variable hydraulic master cylinder when twisted in the opposing direction past the neutral position. The twist throttle portion draws a throttle cable into the device in proportion to the degrees of rotation past the neutral position of the grip. Similarly, a hydraulic master cylinder transports hydraulic fluid out a hydraulic fluid output port in increasing volume and pressure in direct proportion to the degrees of rotation past the neutral position of the grip in the opposing direction.

The twist throttle with integrated hydraulic master cylinder essentially comprises a helically shaped cam formed in a cylindrical sleeve wherein the sleeve is rotatable around the circumference of an inner stem. A pliable grip covers the helical cam sleeve to provide a convenient operator grip. A hydraulic follower, being cylindrically shaped is slidable within an inner longitudinal bore of the inner stem. The hydraulic follower has a cam follower bearing set mounted on a shaft fixed perpendicularly at a point on the circumference of the follower so as to position a top bearing in the helical cam and a lower bearing in a longitudinal guide cam. The guide cam is a slot cut in the inner steam running linearly and longitudinally along the inner stem. The mechanisms provide for the follower to slide back and forth with the bore of the inner sleeve in response to the rotational position of the helical cam sleeve and hence the helical cam relative to the longitudinal guide cam as the helical cam and the longitudinal guide cam openings must coincide as provided by the cam bearings.

The helical cam has at least one cam portion having a profile as represented by differing pitches of the helix. As the amount of linear displacement of the hydraulic follower within the inner stem cylinder bore is in direct proportion to the rotation of the helical cam sleeve, the pitch of the profile determines the number of degrees of rotation required for a selected linear displacement. When two cam portions are incorporated, a central neutral position defines the transition between two helical cam portions, one being for throttle activation and the other for hydraulic master cylinder activation. When the hydraulic follower is at the neutral position, neither the hydraulic master cylinder nor the throttle are activated.

The inner stem, having a proximate and distal end, has an outside diameter commensurate with the inside diameter of a tubular handlebar with the proximate end inserted into the end of a handlebar thereby forming a handlebar grip and extension. The hydraulic fluid output port and throttle cable routing is through the proximate end of the inner stem thereby permitting the cable and hydraulic lines to be routed internally in a tubular handlebar. The device is fixed to the handlebar by means of the reservoir and clamp comprising a hydraulic fluid reservoir with a curved bottom and a semicircular clamp when bolted to each other on and around the outside diameter of a handlebar fashioned with a hole to accommodate a hydraulic fluid communicator tube extending between the reservoir and the proximate end of inner stem thereby securely fastening the device to the handlebar.

The inner stem bore further provides the cylinder for the hydraulic master cylinder portion formed in the proximate end of the apparatus wherein the hydraulic follower presses against the hydraulic piston located in front of the hydraulic follower being within the same bore to activate the master cylinder. A throttle piston, also being a cylindrically shaped element and located behind the hydraulic follower within the inner stem bore, has a throttle cable centrally fixed. When the hydraulic follower moves to the rear of the bore, the throttle piston is forced to the distal end of the device thereby pulling the throttle cable towards the end of the handlebar and activating a connected throttle. The throttle cable is routed from the centrally located cable ferrule formed in the throttle piston through a cable way slot in the hydraulic follower onwards through an opening in the inner stem into a cable guide cut longitudinally along the outer surface of the inner stem through to the front of the apparatus. The throttle cable guide slot therein conceals the throttle cable from the exterior and routes the cable within the handlebar.

A thrust bearing is mounted to the distal end of the inner stem providing a bearing surface for the helical cam sleeve to accommodate the longitudinal thrust resulting from the twisting motion of the sleeve.

The hydraulic master cylinder is typically used for activating braking or clutch systems; however, any hydraulic system requiring a master cylinder may use this device. As the hydraulic cylinder piston requires less linear displacement by more force to activate than the throttle mechanism, the pitch of the helical cam is higher than that of the throttle portion thereby requiring more rotation of the grip to achieve the required mechanical advantage. Conversely, throttle portion of the helical cam has a lower pitch as less force is required but more linear displacement is required for a cable linked.

A twist activated hydraulic master cylinder integrated with a twist activated throttle have numerous advantages over the prior art. The fact that no additional externally mounted mechanical levers are required on the handlebars alone provides numerous advantages related to practicality including improved styling with a clean design, reduction of damage to exposed components, improved reliability, and reduced debris intrusion. More importantly, the constant grip of the steering mechanism is maintained no release of the grip is required to activate the device.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings.

DETAILED DESCRIPTION OF THE PREFERRED EMBODIMENT

Although particular embodiments of the invention have been described in detail for purposes of illustration, various modifications may be made without departing from the spirit and scope of the invention. Accordingly, the invention is not to be limited except as by the appended claims. Referring now in greater detail to the various figures of the drawings wherein like reference characters refer to like parts, there is shown in a perspective view at 10 in FIG. 1, a new type of twist activated vehicle control for throttle activation and an integral twist activated hydraulic cylinder particularly suitable for mounting and use on a motorcycle hand bar; however, the apparatus is also suitable for other applications requiring similar control activation.

Figure 1:
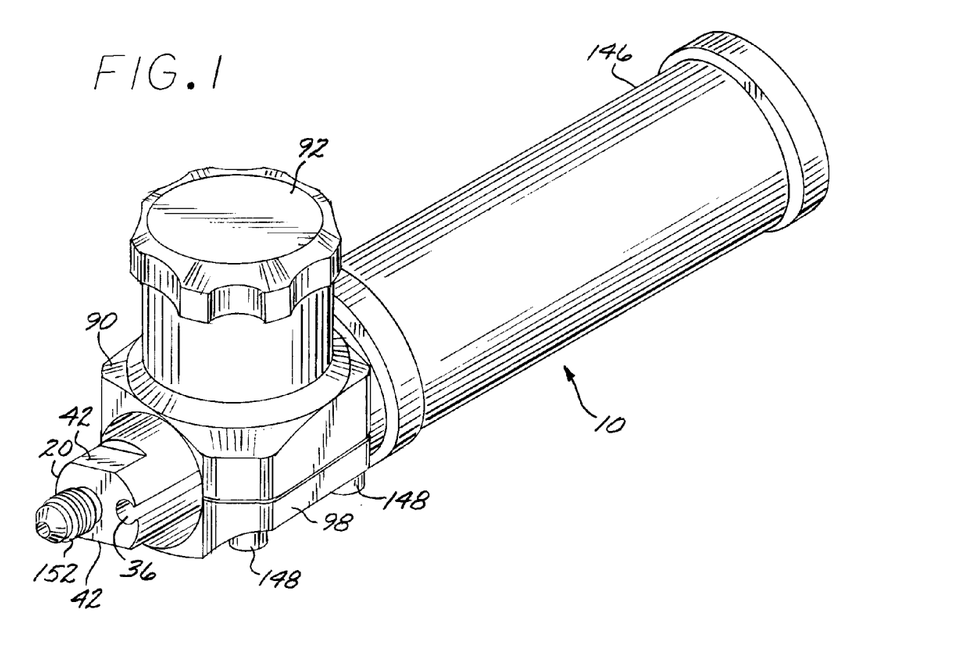
FIG. 1 is a perspective view according to the present invention integrated in a motorcycle handle bar, showing the grip, the hydraulic fluid reservoir and a portion of a motorcycle handle bar with the hydraulic line and the throttle cable emerging from the handle bar.

The perspective view of the present invention shown at 10 in FIG. 1, provides an exterior view of the invention essentially comprising a hydraulic master cylinder and a cable retraction apparatus operator activated by means of a twist mechanism as shown surrounded by an optional cushioned hand grip. The apparatus is preferably mounted to the end of a tubular handle bar of a vehicle such as a motorcycle for purposes of controlling a hydraulic brake or clutch and a cable driven throttle mechanism. When mounted to a handle bar, the apparatus acts as an extension to the handle bar as a handle grip. Twisting the grip around the axis of the handle bar activates the operator twist mechanism of the present invention. Twisting the grip clockwise past a central neutral position proportionally activates the hydraulic master cylinder portion whilst a counter clockwise rotation proportionally activates the throttle mechanism. The operator twist mechanism further comprises a helically formed cam surface rotatable around the central axis of the apparatus followed by a cam follower bearing mounted on a centrally positioned follower piston wherein the piston slides longitudinally within a longitudinally located cylinder responsive to the rotational position of the handle grip.

Figure 2:
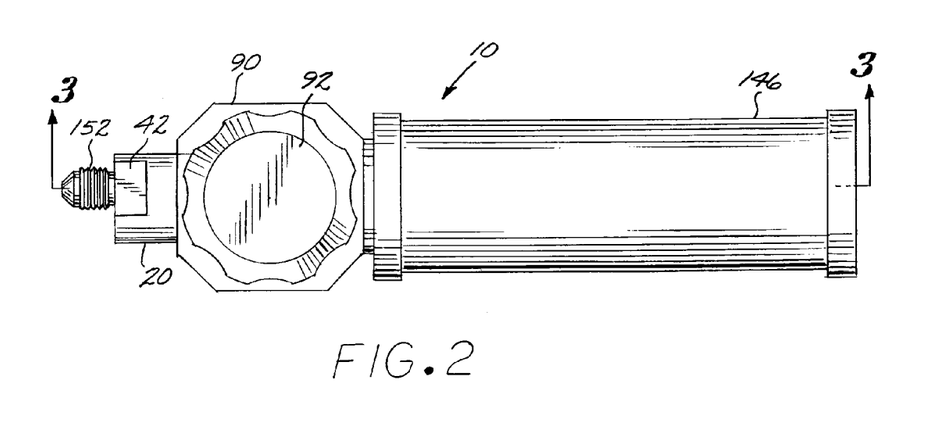
FIG. 2 is a top elevation view of the present invention as in FIG. 1.

Referring now to FIG. 2, the apparatus is inserted into the open end of a tubular handle bar with the threaded hydraulic pipe fitting 152, being in direct hydraulic communication with the output port of the master cylinder, protruding into the central opening of the handle bar. The threaded hydraulic pipe fitting 152 is further connected to the hydraulic clutch or brake system of the vehicle by means of hydraulic piping routed through the center of the handle bar. The outside diameter of the inner stem 20 is constructed so as to snuggly fit into the central opening of a typical motorcycle tubular handle bar. Convenient wrench flats 42 formed into the end of the inner stem 20 provide a means to grasp the inner stem 20 whilst fixing a hydraulic pipe to the threaded hydraulic pipe fitting 152.

Figure 3:
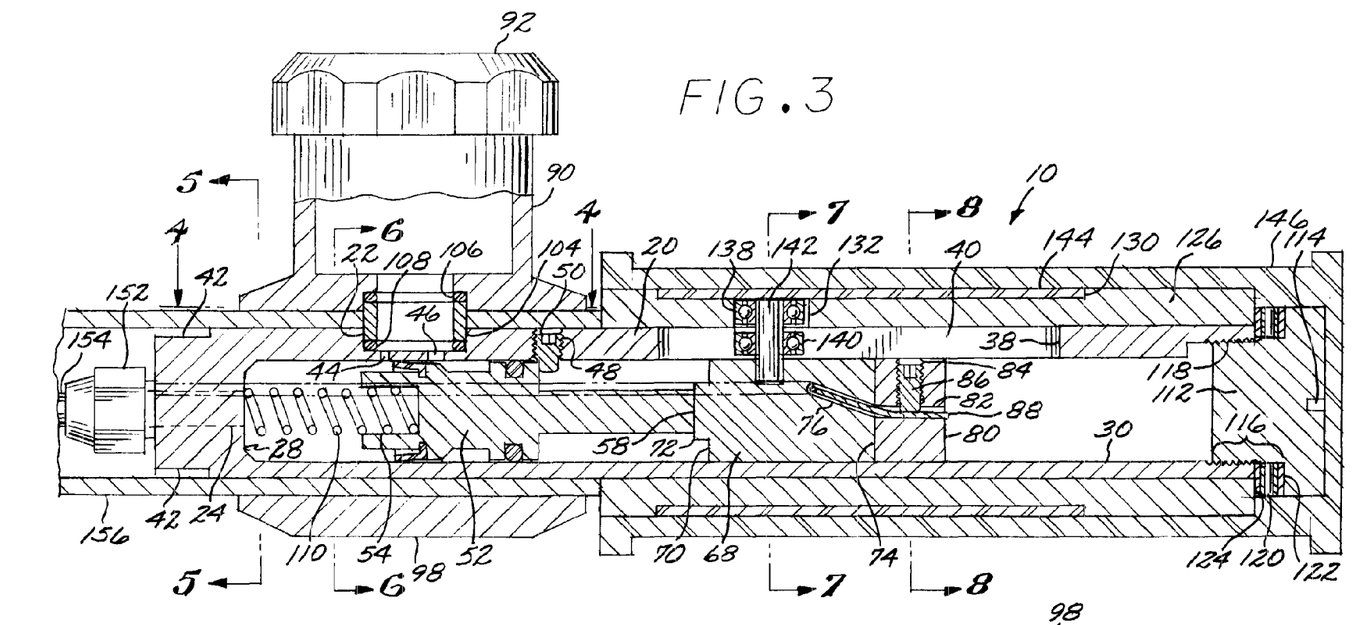
FIG. 3 is a cross section view, taken on Line 3-3 of FIG. 2, showing the hydraulic and throttle mechanism in the neutral position.

Referring now to FIG. 3 showing a cross section view, the invention is constructed around a centrally located inner stem 20 forming the structural frame of the device being machined and formed to accommodate the various elements of the assembly. Note that the inner stem assembly further comprises a cylinder bore 30 machined into the inner stem 20 and having a cylinder bore bottom 28 in combination with the cylinder bore forming a brake cylinder wherein hydraulic piston 52 is slidably and first inserted into the bore. Hydraulic follower 68 is a cylindrically shaped piston with a front relief 70 positioned behind the hydraulic piston 52 with an outside diameter so selected as to be free to slide within the inner stem bore 30. Throttle piston 80 is also a cylindrically shaped and dimensioned to slide within the bore 30 of the inner stem 20. The throttle piston 80 is positioned behind the hydraulic follower 68. A hydraulic piston spring 110, retained by hydraulic piston spring containment cup 54 in the front end of the hydraulic piston 52, returns the hydraulic piston 52 to a non-activated position, as illustrated in FIG. 3, by forcing the hydraulic piston 52 away from the cylinder bore bottom 28 and against the inner stem hydraulic piston set screw 50. Note that the hydraulic piston set screw 50 is received by the inner stem hydraulic piston set screw threaded receiver 48.

Referring further to FIG. 3, the hydraulic follower 68 is a driven element of the apparatus wherein the follower 68 slides longitudinally within the inner stem bore 30 as the longitudinal position is determined by the rotational position of a helically shaped cam surface 132 machined in cam sleeve 126. The cam sleeve 126 is tubular in shape with an internal diameter selected to slide over the outside diameter of the inner stem 20. A helical cam follower bearing 138 is mounted to hydraulic follower 68 by means of the follower bearing mount 142, being a pin shaped shaft, perpendicularly fixed into the outer diameter of the hydraulic follower 68 and retained in the hydraulic follower 68 by being press fitted into the follower bearing receiving recess 130. The helical cam follower bearing 138 is a roller bearing pressed on to the top end of the bearing mount 142 and so positioned such that the outer bearing surface is adjacent to the helical cam 132 surface in the cam sleeve 126. Note that the helical cam 132 surface is a spiral shaped slot cut in the cam sleeve 126 having a constant width approximately equivalent to the outside diameter of the helical cam follower bearing 138. A longitudinal guide cam 38 is machined into the inner stem 20 running along the length of the inner stem 20 for a length selected to limit the longitudinal sliding motion of the hydraulic follower 68. A guide cam follower bearing 140 is positioned between the helical cam follower bearing 132 and the hydraulic follower 68 being pressed onto the brake follower bearing mount 142. The longitudinal guide cam 38 has adjacent guide cam surfaces 40 fashioned parallel to each other at a distance approximately the outer diameter of the longitudinal guide cam bearing 140. The hydraulic follower 68 is therefore selectively positioned longitudinally within the inner stem bore 30 by a rotational movement of the helical cam sleeve 126 wherein the helical cam bearing 138 tracks with the helical cam 132 surfaces forcing the longitudinal guide cam bearing to move longitudinally along the inner stem longitudinal guide cam 38 resulting in the hydraulic follower 68 to respectively be positioned in the corresponding position with the inner stem bore 30. The helical cam 132 and the longitudinal guide cam 38 interaction thereby determines the location of the hydraulic follower 68 within the inner stem bore 30.

The hydraulic follower 68 may therefore be selectively positioned by a twisting motion of the helical cam sleeve to force the follower 68 forward towards the hydraulic piston 52. The hydraulic follower 68, having a hydraulic piston activation surface 72, not be fixed to the hydraulic piston rear face 58, pushes the hydraulic piston 52 forward within the inner stem bore 30. The resulting forward motion of the hydraulic piston 52 forces hydraulic fluid out through the inner stem output port 24 and onwards to devices in direct hydraulic communications with the hydraulic pipe 154 being fixed to the inner stem output port 24 by the threaded hydraulic pipe fitting 152 fitted into the inner stem output port 24.

Still referring to FIG. 3, the throttle piston 80, being cylindrically shaped has a centrally located bore in the face of the piston. This forms a throttle piston cable way 82 having a diameter selected to accommodate a flexible throttle cable 88 being secured within the throttle piston cable way by ferrule screw 86. A threaded ferrule screw receiver bore 84 is drilled and tapped perpendicular to the outside diameter of the throttle piston 80 such that the ferrule screw 82 may be tightened against a throttle cable 88 within the cable way 82. The length of the ferrule screw 82 is selected to avoid interference with the inner stem bore 30 surface.

The throttle piston 80 is forced longitudinally within the inner stem bore 30 by the adjacently positioned hydraulic follower 68 wherein the follower rear surface 74, not being fixed to the throttle piston, forces the throttle piston rearward within the inner stem bore 30 when the helical cam sleeve 126 is rotationally positioned to force the hydraulic follower 68 longitudinally rearward through the inner stem bore 30. It should be emphasized that the throttle piston 80 is not fixed to the follower 68 thereby being free to slide within the bore 30, being an important feature such that the follower 68 separates from contact with the throttle piston when the hydraulic follower 68 moves forward from a neutral position to activate the hydraulic piston. Conversely, when the hydraulic follower moves rearward, the hydraulic follower surface 72 separates from the hydraulic piston 52, being restrained by the inner stem hydraulic piston set screw, and the rear surface 74 of the follower 68 contacts the throttle piston 80 forcing the throttle piston 80 rearward through the inner stem bore 30. Tension on the throttle cable 88, being in direct mechanical connection with a throttle device to be activated, maintains the contact between the throttle piston 80 and the hydraulic follower 68 whilst the helical cam sleeve is twisted away from the neutral position to activate the throttle mechanism.

Figure 4:
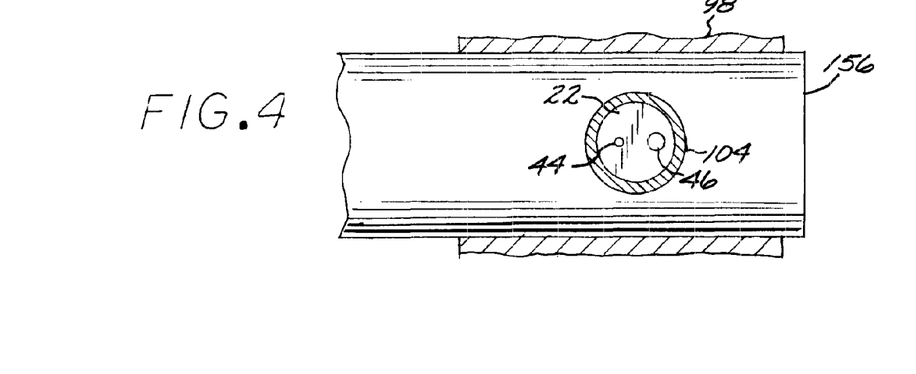
FIG. 4 is a sectional view taken on Line 4-4 of FIG. 3, showing the location wherein the reservoir of the present invention is mounted to a handle bar end exposing the hydraulic fluid communicator tube in position in the handle bar mounting slot and above the inner stem hydraulic fluid supply port.

As illustrated in FIGS. 3 and 4, the apparatus is mounted to a tubular bar, such as a motorcycle handle bar, by means of a clamping action formed by a hydraulic reservoir element 90 clamped to a reservoir clamp 98. During the operation of mounting the apparatus to a tubular handle bar, a circular hole is fashioned perpendicularly into the surface of the tubular handle bar 156 for purposes of retaining a cylindrically shaped hydraulic fluid communicator tube 104. The front end of the inner stem 20 has an outside diameter engineered to slide snuggly into the bore of the tubular handlebar and positioned such that the hydraulic fluid communication tube receiver 22 being a cylindrically shaped recess fashioned in the outer diameter of the inner stem and having a flat bottom 28, and a forward and a rear hydraulic fluid supply port, 44 and 46. The inner stem 20 is slid into the tubular handlebar 156 and positioned such that the communicator tube receiver 22 is aligned with the circular hole in the handlebar 156. The communicator tube 104 is pressed into the receiver 22 and has sufficient height to accommodate the thickness of the handlebar and to be retained by the communications tube receiver 22 similarly bored into the bottom of the hydraulic fluid reservoir 90. It will be appreciated that the communicator tube 104 is preferably sealed to the reservoir 90 by hydraulic fluid communicator tube reservoir seal 106 and sealed to the inner stem by inner stem seal 108, both typically being an o-ring. The assembly provides for hydraulic fluid residing in the hydraulic fluid reservoir 90 to be supplied to the inner stem 20 and further to the hydraulic cylinder of the apparatus.

Figure 5:
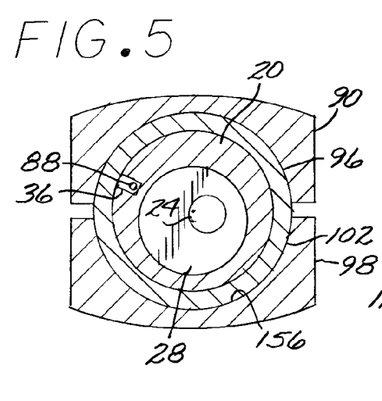
FIG. 5 is the cross section view, taken on Line 5-5 of FIG. 3, showing the reservoir clamped to the handle bar bound with the reservoir clamp, further showing the offset cylinder bore of the inner stem with the throttle cable guide slot longitudinally positioned along the stem and along the outer circumference of the inner stem having the throttle cable in position.
Figure 6:
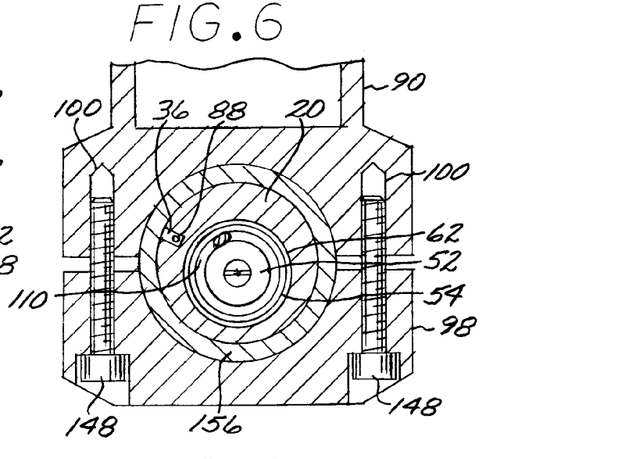
FIG. 6 is the cross section view, taken on Line 6-6 of FIG. 3, showing the reservoir secured to the reservoir clamp by means of screw fasteners and the front end of the hydraulic cylinder positioned in the offset cylinder bore of the inner stem mounted within the handle bar, hydraulic piston return spring in hydraulic piston seal receiver cup and the front seal in direct contact with the outer circumference of the brake piston and the inner circumference of the inner stem bore.

Details of the reservoir clamping action are more clearly illustrated in FIG. 5, a cross section taken along line 5-5 of FIG. 3 and FIG. 6, a cross section taken along line 6-6 of FIG. 3. The hydraulic reservoir hydraulic fluid reservoir 90, forming the top portion of the apparatus mounting mechanism comprises a central reservoir vessel sealed to by means of a removable reservoir screw cap 92 fitted to the top edge of the reservoir permitting the user to adjust the hydraulic fluid level of the apparatus. The bottom surface 96 of the reservoir is curved to match the top half of the circumference of a typical handlebar 156. The bottom curved surface 96 extends substantially half the circumference of the handlebar 156, but not the full half circumference so as to allow the reservoir bottom clamp 98, being similarly formed with a curved surface, to match the opposing half circumference of the handlebar 156 thereby providing a gap between the two pieces when mounted to the handlebar 156 providing clearance to securely clamp the two pieces together, firmly grasping the handlebar 156. Reservoir screw fasteners 148 are received by threaded receivers 100 in the reservoir 90 portion and inserted through holes in the reservoir clamp 98. Tightening the fasteners 148 secures the apparatus to the handlebar 156 with the hydraulic fluid communicator tube 104, being fixed in recesses in the inner stem 20 and the reservoir 90 preventing the apparatus from rotating within the handlebar 156 or from sliding out of the handlebar 156 interior.

Note also in FIGS. 5 and 6, the throttle cable guide 36 milled longitudinally into the outer surface of the inner stem 20 forming a channel for the throttle cable 88 to be routed from the throttle piston 80, the end being retained by the ferrule, guiding the cable 88 through to the front of the inner stem 20, as in FIG. 1, and into the annular opening of the handlebar 156 for further routing to a throttle control device. The throttle cable 88 is free to move back and forth within the guide 36 being responsive to the longitudinal position of the throttle piston 80 within the inner stem bore 30 and the tension exerted by a throttle control device. Note also the offset centering of the inner stem bore 30 within the inner stem 20. This offset permits the wall of the inner stem 20 to provide additional strength and thickness for the longitudinal guide cam, located and centered within the thickest stem portion, while also providing additional surface area for the guide cam bearing 38. The output port 24 is also offset in the stem and in the cylinder bore bottom 28, substantially opposing in position the location of the throttle cable guide 36, for purposes of providing clearance for the throttle cable guide 36 to conveniently stand clear of hydraulic fittings while also avoiding interference with the internal diameter of the handlebar 156, such as illustrated in FIG. 3 at 152.

Returning briefly to FIG. 3, the hydraulic follower 68 has a throttle cable groove 76 running from the center of the rear face of the follower 68 such that the throttle cable 88 is free to slide and align with the ferrule of the throttle piston 80. This groove also allows the rear face 74 of the hydraulic follower 68 to press flat against the front face of the throttle piston 80 and eliminates binding of the throttle cable 88 and follower 68. Note further that the throttle cable 80 is routed through a hole through the inner stem bore 30 aligned with the inner stem throttle cable guide 36 for subsequent routing out the proximate end of the inner stem 20 and into the annulus of a handlebar.

Further in FIG. 6, showing a cross section view of an embodiment of the present invention taken along line 6-6 of FIG. 3, the throttle cable guide 36 still visible with the throttle cable 88, the front portion of the hydraulic piston 52 is shown with hydraulic piston spring 110 seated in a piston spring containment cup 54 feature in the front portion of the hydraulic piston 52, surrounded by the piston seal 62 sealing the hydraulic piston 52 against the bore of the inner stem 20.

Figure 7:
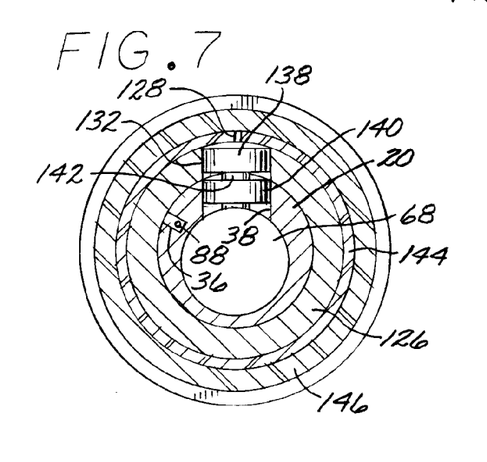
FIG. 7 is a cross section view, taken on Line 7-7 of FIG. 3, showing the grip surrounding the cam sleeve recessed into the helical cam with the upper helical cam follower bearing in the helical cam chase, the lower cam follower bearing in the longitudinally positioned guide cam of the inner stem with the bearings mounted to the brake follower centrally located in the offset bore of the inner stem and throttle cable positioned in the brake piston follower cable way.

Next in FIG. 7, a cross sectional view taken along line 7-7 of FIG. 3, shows a cross section of the hydraulic follower 68 with the guide cam and helical cam follower bearings 140 and 138 positioned within the respective guide and helical cams 38 and 132. The cam shell 144 fits into a recess 130 in the helical cam sleeve 126 is optional for securing and protecting the helical cam 132 surfaces from debris. The cam shell 144 is formed from a flat rectangular metal sheet rolled into a tube with a gap 128 between the opposing ends of the metal sheet. The gapped tubular shape of the shell provides for easy of assembly wherein the shell may be temporarily expanded in diameter to slide over the cam sleeve 126 for insertion into the cam sleeve recess 130 in the cam sleeve 126, as illustrated in FIG. 3. The grip 146 encircling the cam shell 144 and cam sleeve 126 is preferably constructed of a polymer or elastomeric material so as to provide characteristics suitable for gripping by and comfort for an operator. In FIG. 7, note that the cam sleeve 126 is free to rotate concentrically around the inner stem 20 outer circumference responsive to the rotation of the grip 146 as the helical cam follower bearing 138 is selectably positioned within the helical cam 132.

Figure 8:
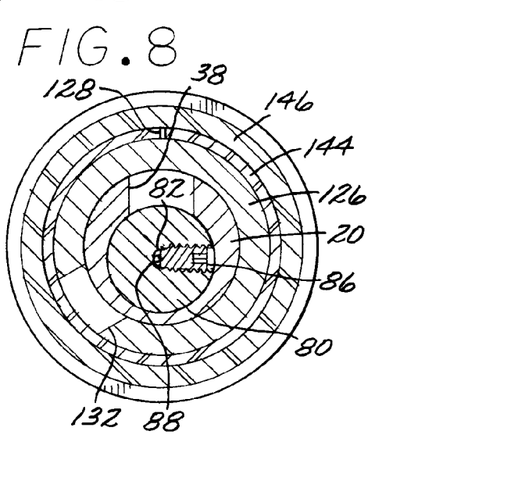
FIG. 8 is a cross section view, taken on Line 8-8 of FIG. 3, showing the throttle piston centrally located in the offset bore of the inner stem having a ferrule screw binding the throttle cable in a centrally positioned hole in the throttle piston.

Details of the relative positioning of the throttle elements are shown in FIG. 8 being a cross sectional view taken along line 8-8 of FIG. 3. Note that the throttle piston 80 is free to slide within the offset bore of the inner stem 20. The cable ferrel mechanism comprises, in part, the ferrel screw 86 tightly seated against the throttle cable 88 in the centrally located cable way 82.

Figure 9:
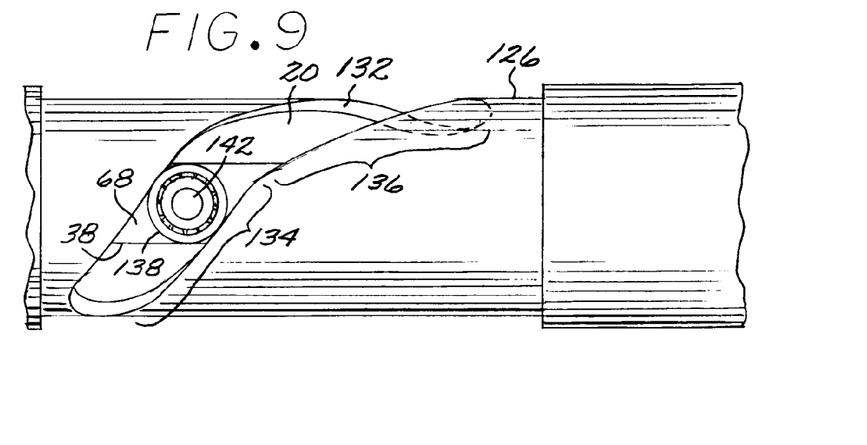
FIG. 9 is a top plan view of a portion of the helical cam of the present invention with the grip and cam sleeve removed for clarity of the helical nature of the throttle and brake cam surfaces showing the helical cam follower bearing positioned in the throttle portion of the helical cam surface.

An essential element according to the present invention is illustrated in FIG. 9 showing details of the helical cam 132 in the cam sleeve 126, and its relative positioning to the longitudinal guide cam 38 in the inner stem 20. It will be appreciated that as cam sleeve 126 is rotated in either direction around the inner stem 20, follower 68 is forced either forward or backward within the bore of the inner stem 20 as the cam follower bearings track the helical cam 132 and longitudinal guide cam 38. The helical cam 132 is a varying spiral shaped cut in the helical cam sleeve 126 along the longitudinal axis of the sleeve. As configured in FIG. 9, the helical cam has a right hand twist shape wherein a right hand rotation of the helical cam sleeve positioned the cam follower bearing 138 closer to the front of the sleeve while a left hand rotation positioned the bearing towards the rear of the helical cam. Note that in the illustrated embodiment the helical cam 132 has two cam portions exhibiting differing profiles 136 and 134. The pitch of the profile of the cams is selected to determine the degrees of rotation of the cam sleeve required to accomplish a selected respective longitudinal displacement of the follower 68. The selected pitch to displacement ratio is also directly related to the torque selected and required to twist the grip of the device activate the hydraulic or throttle mechanisms. Therefore the profile of the cams may be fashioned to provide a desired twisting torque force requirement at any point within the range of the apparatus. For example, a linear pitch for a first cam portion associated with the hydraulic cylinder will likely yield an increasing torque requirement as the cylinder is activated depending upon the specifics of the hydraulic requirements of the activated system. The lower the pitch of the profile the greater the longitudinal displacement per degree of rotation. Consequently, the pitch may be varied, if required for a specific application, along the length of the profile to provide a constant or varying predetermined twist force throughout the full range of activation.

When force is applied to twist grip 146, to activate the hydraulic piston 52, a reactive force is experienced by the cam sleeve 126 tending to force the sleeve towards the back of the inner stem 20 therefore a means of longitudinally securing the helical cam sleeve to the inner stem whilst allowing rotation. Consequently, thrust bearing 120 is provided to resist the force. Any suitable thrust bearing may be utilized. In the illustrated embodiment, the thrust bearing comprises a thrust bearing end cap 112, a thrust bearing 120 with an inner washer 122 below and an outer washer 124 above slid over the threaded shaft 116 portion of the thrust bearing end cap 112. Because the cam sleeve 126 rotates around the outer circumference of the inner stem 20, the thrust bearing assembly also is arranged such that the bearing assembly rotates around the central axis of the inner stem 20. Accordingly, the rear end of the inner stem 20 is centrally bored and tapped to accommodate the threaded base 118 of the thrust bearing end cap 112. The thrust bearing thereby is positioned between the rear end of the cam sleeve 126 and the bearing end cap 112 thus providing a thrust surface for the cam sleeve 126 to transfer rearward directed force from the cam sleeve 126 to the inner stem 20 hence retaining the cam sleeve 126 in the apparatus and from sliding off the distal end. The thrust bearing end cap screw slot 114 is provided for convenience of assembly by providing a surface to thread the cap into the inner stem.

Figure 10:
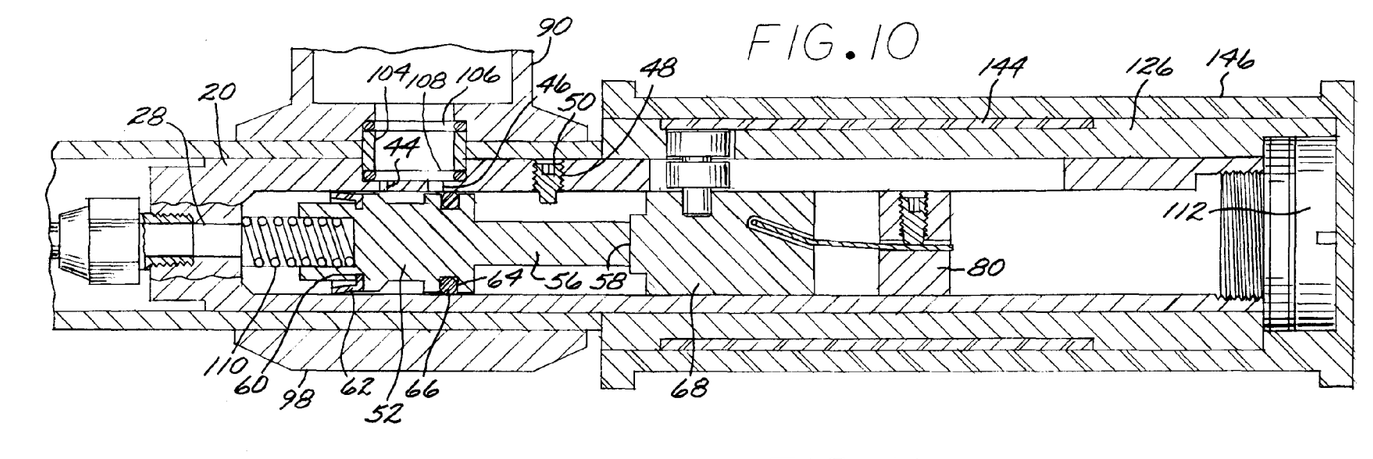
FIG. 10 is a cross section view, taken on Line 3-3 of FIG. 2, wherein the grip has been twisted into the full braking position showing the helical cam follower bearing forward along the helical cam brake surface portion, the brake follower forcing the brake piston forward compressing the brake piston return spring with the forward brake piston seal confining the hydraulic fluid with the inner stem cylinder and out the hydraulic fluid output port to the vehicle braking system hydraulic fluid pipe.

The hydraulic follower 62 longitudinal position within the central bore 30 determines the mode of operation of the apparatus. Referring to FIG. 10 wherein the apparatus is shown activating the hydraulic piston 52, hydraulic fluid is pressurized and forced out the output port 24. The hydraulic piston 52 has an activator push element 56 being a cylindrically shaped expansion of the rear of the hydraulic piston 52. The push element 56 provides the hydraulic follower 62 a surface to contact the hydraulic piston while also providing convenient spatial alignment.

Figure 11:
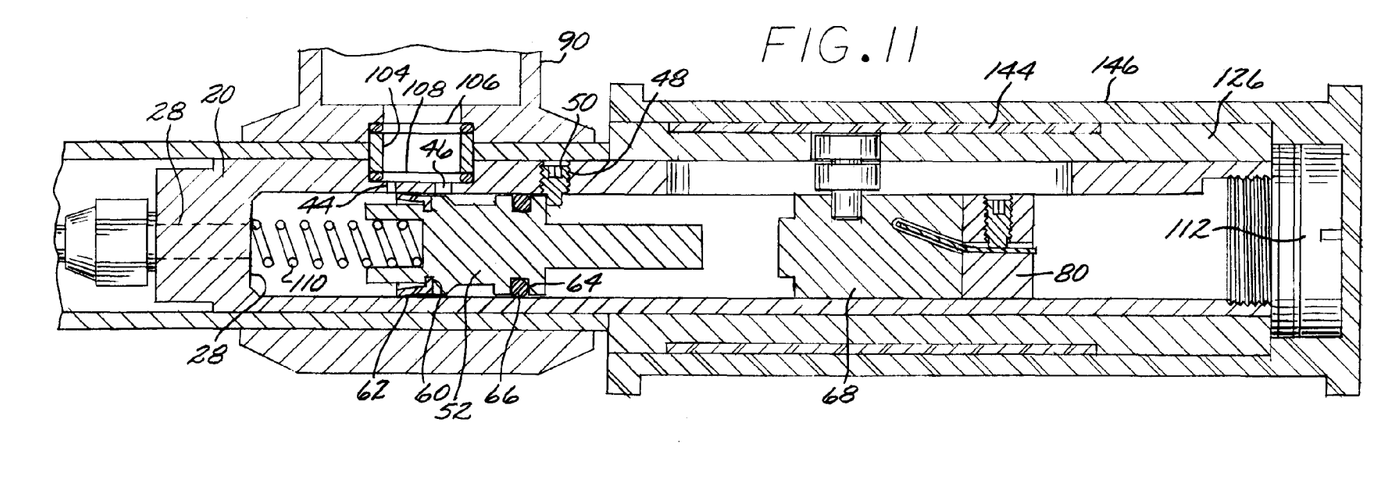
FIG. 11 is a cross section view, taken on Line 3-3 of FIG. 2, similar to FIG. 10 wherein the grip has been twisted into the neutral position showing the brake piston rear surface relief resting on the set screw being forced back by the brake piston return spring now permitting flow of hydraulic fluid from the reservoir; and, the throttle piston in contact with the brake follower push element.

The hydraulic portion of the apparatus defines a typical hydraulic master cylinder, having functionality well known in the prior art, with the hydraulic piston 52 slidable in a cylindrically shaped bore having a bottom 28 with the output port 24 in fluid communication with the cylinder bore 30. The apparatus in a hydraulic neutral mode, as shown in FIG. 11, comprises a return spring 110 fitted between the front end of the piston 52 and the cylinder bottom 28 providing a return of the hydraulic piston 52 to the hydraulic neutral location in the bore 30. A forward hydraulic seal 62, preferably a lip type seal, is positioned such that the lip faces towards the cylinder bottom 28. The seal is retained by a circumferentially positioned retainer groove 60 proximate to the front end of the hydraulic piston 52. In the neutral position, the lip seal 62 presses against the cylinder wall at a location behind and proximate to a forward fluid supply port 44 providing fluid communication between reservoir 90 and the cylinder bore 30. When the hydraulic piston 52 moves forward during activation, the lip seal 62 moves past the forward fluid supply port 44 thereby sealing the cylinder from the reservoir 90 allowing the piston 52 to compress the fluid captured in the cylinder. There is also a hydraulic piston o-ring seal 66 positioned in a retainer groove 64 milled in the hydraulic piston circumference towards the rear of the piston and so engineered to seal against the cylinder bore. The o-ring seal 66 is positioned behind a rear fluid supply port 46 providing fluid communication between the reservoir and the vent chamber defined by the lip seal 62, the circumference of the hydraulic piston 52, the rearwardly positioned o-ring seal 66 and the inside surface of the inner stem bore 30. The o-ring seal 66 is further positioned at a location on the hydraulic piston 52 such that the seal is always longitudinally located behind the rear fluid supply port 46 regardless of the stroke position of the piston 52. During activation of the hydraulic piston 52, the rear fluid supply port 46 permits fluid flow back into the reservoir to provide for the volume reduction of the vent chamber as the lip seal 62 expands rearward as hydraulic fluid pressure increases on the forward side of the seal when the hydraulic fluid is compressed. In this manner the lip seal 62 is permitted to press with an increasing hydraulic fluid pressure, during a compressive stroke, against the cylinder wall as the fluid behind the lip seal 62 is vented to the reservoir 90.

Figure 12:
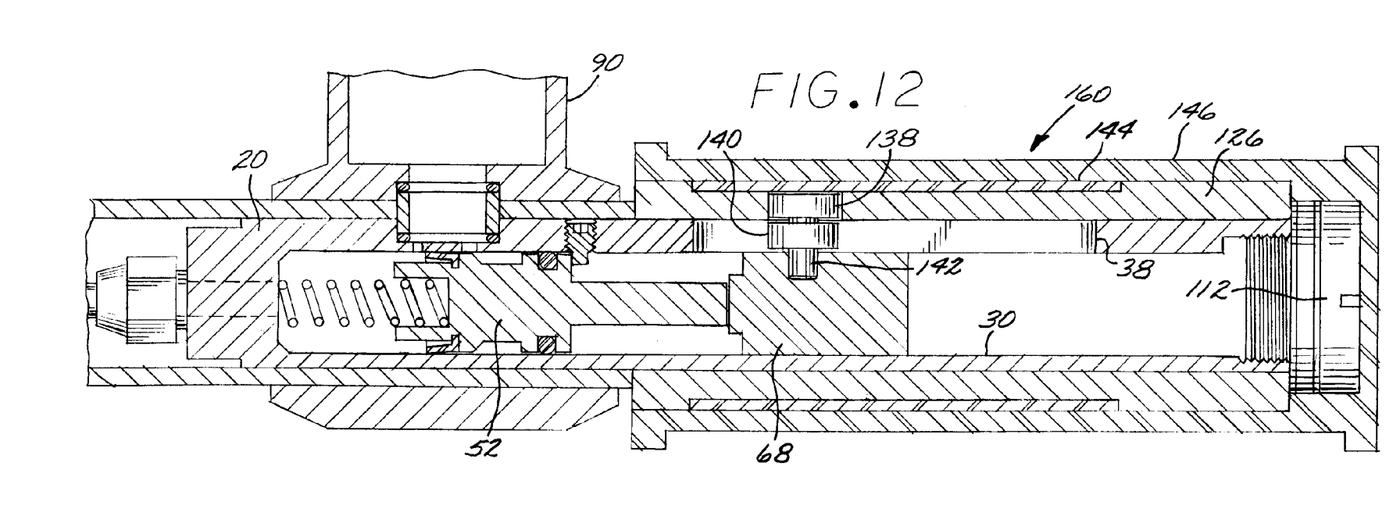
FIG. 12 is a cross section view similar to FIG. 11 showing an alternate embodiment of the present invention without a throttle piston and throttle cable for applications requiring only a twist activated hydraulic cylinder.
Figure 13:
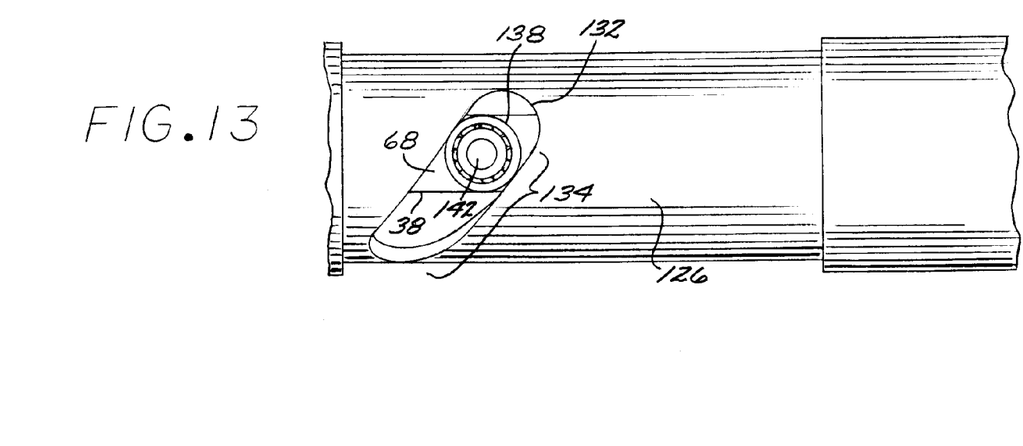
FIG. 13 is a top plan view similar to FIG. 9 showing an alternate embodiment of the helical cam without the throttle cam surface for applications requiring only a twist activated hydraulic cylinder.

It will be appreciated that the elimination of the throttle piston and associated throttle portion of the helical cam, as shown in the alternate embodiment of FIGS. 12 and 13, provides a twist activated hydraulic master cylinder for applications where a cable linked throttle are not required. This alternate embodiment may be used, for example, as a clutch activator in application where another embodiment is mounted as the opposing handlebar grip. In the alternate embodiment, the throttle portion of the helical cam is not milled, the throttle piston is absent, and the cable ways are optionally not cut so as to reduce the manufacturing cost of the device.

What is claimed is:

1. A twist activated vehicle control with integral hydraulic master cylinder comprising;
   an inner stem in the form of a cylinder having a proximate end, an open distal end, an inner bore, an outside circumference, a longitudinal axis, an outlet port in the proximate end, a forward and rear supply port, and a longitudinally oriented guide cam being a slot cut along the length near the distal end, the proximate end having a means for receiving a tubular handle bar handlebar,
   a hydraulic fluid reservoir clamped around the inner stem in direct fluid communication with forward and rear supply ports of the inner stem,
   a hydraulic piston having a front end, a rear end and forward and rear seals, the piston being inserted in the inner bore of the inner stem being responsive to a return spring between the front end of the hydraulic piston and the proximate end of the inner stem and is positioned to interact with the inner stem forward and rear supply ports such that the rear supply port is positioned between the forward and rear seals and the forward supply port is positioned between the forward and rear seals of the hydraulic piston during activation and forward of the hydraulic piston forward seal when deactivated,
   a hydraulic follower, having a cylinder shape, is slidably positioned within the inner bore of the inner stem and adjacent to the rear of the hydraulic piston, the hydraulic follower further having a perpendicularly mounted bearing assembly having an upper and a lower bearing with the lower bearing positioned within and to follow and interact with the guide cam of the inner stem,
   a helical cam sleeve being a tubular shaped surrounding and axially rotatable around the circumference of the inner stem having a helical cam having at least one cam surface portion receiving the upper bearing of the hydraulic follower bearing assembly whereby a twisting action in one direction of the helical cam sleeve around the inner stem delivers hydraulic fluid from the hydraulic fluid reservoir at a pressure and volume proportional to degree of motion out the outlet port of the inner stem; and,
   a thrust bearing longitudinally securing the helical cam sleeve to the inner stem whilst allowing rotation of the sleeve around the inner stem, the thrust bearing being fixed to the distal end of the inner stem so as to accommodate rearward thrust of the helical cam sleeve.

2. The twist activated vehicle control with integral hydraulic master cylinder of claim 1 wherein the hydraulic piston has an activator push element being a cylindrical expansion of the rear of the piston.

3. The twist activated vehicle control with integral hydraulic master cylinder of claim 1 further comprising a handle grip surrounding the helical cam sleeve.

4. The twist activated vehicle control with integral hydraulic master cylinder of claim 3 wherein the handle grip is manufactured from an elastomeric material.

5. A twist activated vehicle control with integral hydraulic master cylinder comprising;
   an inner stem in the form of a cylinder having a proximate end, an open distal end, an inner bore, an outside circumference, a longitudinal axis, an outlet port in the proximate end, a forward and rear supply port, and a longitudinally oriented guide cam being a slot cut along the length near the distal end, the proximate end having a means for receiving handlebar,
   a hydraulic fluid reservoir clamped around the inner stem in direct fluid communication with forward and rear supply ports of the inner stem,
   a hydraulic piston having a front end, a rear end and forward and rear seals, the hydraulic piston being inserted in the inner bore of the inner stem being responsive to a return spring between the front end of the hydraulic piston and the proximate end of the inner stem and is positioned to interact with the inner stem forward and rear supply ports such that the rear supply port is positioned between the forward and rear seals and the forward supply port is positioned between the forward and rear seals of the hydraulic piston during activation and forward of the hydraulic piston forward seal when deactivated,
   a hydraulic follower, having a cylinder shape, is slidably positioned within the inner bore of the inner stem adjacent to the rear of the hydraulic piston of, the hydraulic follower further having a perpendicularly mounted bearing assembly having an upper and a lower bearing with the lower bearing positioned within and to follow and interact with the guide cam of the inner stem,
   a throttle piston being cylindrically shaped and having a means for retaining a flexible throttle cable routed through cable ways formed in the hydraulic follower and exiting through the inner stem and along the inner stem outside surface out to and through the proximate end of the inner stem and slidably positioned within the inner bore behind the hydraulic follower,
   a helical cam sleeve being a tubular shaped surrounding and axially rotatable around the circumference of the inner stem having a helical cam having at least two contiguous cam portions receiving the upper bearing of the hydraulic follower bearing assembly and having a first cam profile wherein the interaction of the follower and a first cam portion moves the follower towards the proximate end of the inner stem and presses the hydraulic piston when the cam sleeve is twisted in one direction and a second cam profile wherein the interaction of the follower and a second cam portion moves the follower towards the distal end of the inner stem pressing the throttle piston thereby pulling the retained throttle cable when the cam sleeve is twisted in the opposing direction; and,
   a means for longitudinally securing the helical cam sleeve to the inner stem whilst allowing rotation of the sleeve around the inner stem.

6. The twist activated control with integral hydraulic master cylinder of claim 5 wherein the pitch of the helical cam profiles is linear.

7. The twist activated vehicle control with integral hydraulic master cylinder of claim 5 wherein the pitch of the helical cam profiles provide a constant predetermined twist force throughout the full range of activation.

8. The twist activated vehicle control with integral hydraulic master cylinder of claim 5 wherein the pitch of the helical cam profiles provide a predetermined varying twist force through the range of activation.

9. The twist activated vehicle control with integral hydraulic master cylinder of claim 5 wherein the throttle piston means for retaining the throttle cable is a central boring in the throttle piston and a ferrule screw positioned perpendicular to the central boring so as to intersect the central boring wherein the throttle cable is routed through the central boring and secured in place within the bore by the ferrule screw.

10. The twist activated vehicle control with integral hydraulic master cylinder of claim 9 wherein the cable way of hydraulic follower is a groove longitudinally fashioned in the follower.

11. The twist activated vehicle control with integral hydraulic master cylinder of claim 9 wherein the cable way of the inner steam is a hole in the circumference emerging into a guide longitudinally fashioned along the outer surface to the proximate end such that the throttle cable may be routed within the guide and into the annulus of a handlebar.

* * * * *